United States Patent
Allgeier et al.

(10) Patent No.: US 12,061,599 B2
(45) Date of Patent: Aug. 13, 2024

(54) SYSTEMS AND METHODS FOR ASYNCHRONOUS FALLBACK SAVE OPERATIONS

(71) Applicant: NextWorld LLC, Denver, CO (US)

(72) Inventors: Axel Allgeier, Denver, CO (US); David A. Schneider, Aurora, CO (US); Deborah G. Shupe, Centennial, CO (US); Cheyanne Miller, Englewood, CO (US); Joseph Yates, Littleton, CO (US); Vito Solimene, Greenwood Village, CO (US); Viviana Shain, Parker, CO (US); Robert Provencal, Denver, CO (US)

(73) Assignee: NextWorld, LLC, Greenwood Village, CO (US)

( * ) Notice: Subject to any disclaimer, the term of this patent is extended or adjusted under 35 U.S.C. 154(b) by 218 days.

(21) Appl. No.: 17/539,832

(22) Filed: Dec. 1, 2021

(65) Prior Publication Data
US 2022/0171766 A1 Jun. 2, 2022

Related U.S. Application Data

(60) Provisional application No. 63/120,046, filed on Dec. 1, 2020, provisional application No. 63/226,131, filed on Jul. 27, 2021.

(51) Int. Cl.
*G06F 16/00* (2019.01)
*G06F 9/30* (2018.01)
*G06F 9/48* (2006.01)
*G06F 16/23* (2019.01)

(52) U.S. Cl.
CPC ........ *G06F 16/2379* (2019.01); *G06F 9/3009* (2013.01); *G06F 9/4843* (2013.01)

(58) Field of Classification Search
CPC ... G06F 16/2379; G06F 9/3009; G06F 9/4843
USPC ...................................................... 707/694
See application file for complete search history.

(56) References Cited

U.S. PATENT DOCUMENTS

| | | | | |
|---|---|---|---|---|
| 5,666,523 A | * | 9/1997 | D'Souza | G06F 9/4843 712/229 |
| 5,828,847 A | * | 10/1998 | Gehr | H04L 9/40 709/239 |
| 7,853,962 B1 | * | 12/2010 | Romano | G06F 9/547 719/330 |
| 2003/0070005 A1 | * | 4/2003 | Mukundan | G06F 9/542 719/330 |

(Continued)

*Primary Examiner* — Vincent F Boccio

(57) ABSTRACT

Asynchronous fallback save operations herein (also referred to herein as a background save) provide a means for saving very large transactions from a client device within a stateless architecture. When dealing with large transactions, it may take a long time to process records—so long that the connection between the server and the client may time out, causing the user to lose all work or progress that was being saved. Thus, the present technology serves to prevent this "time out" problem while simultaneously allowing users to continue working on something else while a save is still completing. In some implementations, once a user has submitted a save request, the save operation may be carried out in a background thread pool, allowing the user to continue move on to a new task.

20 Claims, 12 Drawing Sheets

(56) References Cited

U.S. PATENT DOCUMENTS

| | | | |
|---|---|---|---|
| 2012/0200716 A1* | 8/2012 | Torikai | H04N 1/32112 |
| | | | 348/207.1 |
| 2015/0082212 A1* | 3/2015 | Sharda | H04L 67/55 |
| | | | 715/764 |
| 2016/0011874 A1* | 1/2016 | Orenstein | G06F 9/3861 |
| | | | 712/237 |
| 2020/0145310 A1* | 5/2020 | Lodhia | H04L 67/568 |
| 2021/0208886 A1* | 7/2021 | Nilsen | G06F 9/461 |

* cited by examiner

SYSTEMS AND METHODS FOR ASYNCHRONOUS FALLBACK SAVE OPERATIONS

CROSS-REFERENCE TO RELATED APPLICATIONS

This application claims priority to U.S. Provisional Application Ser. No. 63/120,046 filed Dec. 1, 2020 and U.S. Provisional Application, Ser. No. 63/226,131 filed Jul. 27, 2021, which are incorporated herein by reference in their entirety for all purposes.

BACKGROUND

Many businesses use customized software to assist users in creating or integrating customized transactions, managing orders, project management, tracking shipments, and similar activities. Channels for delivering such software and services to end-users include cloud computing services such as software as a service (SaaS), platform as a service (PaaS), and more. Client devices often connect to cloud-based services via applications running in web browsers. Where a user of an application running a browser requests to save a large transaction or record, known systems and methods for handling the save of the transaction or record may run into time-out issues during the save, which may make it difficult or impossible to complete a save. In some examples, a web browser may automatically time-out after 30 seconds and lose its connection with the server. As a result, known systems and methods may cause data corruption, data loss, and similar failures when the connection times out.

Users of applications may lose a significant amount of time or work when time outs or various system failures occur, including when saving large amounts of data. Accordingly, a need exists for improved systems and methods for processing requests from applications for saving records so as to prevent or mitigate one or more of the aforementioned problems that users may experience using known systems and methods.

It is with respect to this general technical environment that aspects of the present technology disclosed herein have been contemplated. Furthermore, although a general environment has been discussed, it should be understood that the examples described herein should not be limited to the general environment identified in the background.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments of the present technology generally relate to saving large transactions to a database in a stateless architecture. More specifically, some embodiments relate to systems and methods for implementing asynchronous fallback save (i.e., background save) operations. In one embodiment, a method of operating at least one server comprises receiving, from an application accessed on a client device, a request to save a record and determining that the request is subject to a background save operation. The method further comprises, upon determining that the request is subject to the background save operation, commencing, in a background thread, a save of the record to a database and completing the save of the record to the database using the background thread.

In some embodiments, the method further comprises, upon commencing the save of the record to the database in the background thread, enabling display of a background save notification on the client device, wherein the background save notification indicates that the record will continue saving in the background thread. The method may further comprise, upon completing saving the request to the database, enabling display of a completion notification on the client device, wherein the completion notification indicates that the record saved successfully. In some embodiments, receiving the request to save the record and determining that the request is subject to a background save operation is performed using a first thread. Enabling display of the background save notification on the client device may similarly be performed using the first thread. In some embodiments, the method further comprises initiating a timer for the first thread upon determining that the request is subject to the background save operation. In certain embodiments, enabling display of the background save notification on the client device occurs upon completion of the timer. Moreover, in some embodiments, a connection between the client device and the first thread is closed upon completion of the timer.

In another embodiment, one or more computer-readable storage media have program instructions stored thereon for synchronous fallback save operations. The program instructions, when read and executed by a processing system, direct the processing system to at least receive from an application accessed on a client device, a request to save a record and determine that the request is subject to an asynchronous fallback save operation. The program instructions, when read and executed by the processing system, direct the processing system to, upon determining that the request is subject to the asynchronous fallback save operation, commence, in a separate thread, a save of the record to a database and complete the save of the record to the database using the separate thread.

In yet another embodiment, a system comprises one or more computer-readable storage media, a processing system operatively coupled with the one or more computer-readable storage media, and program instructions stored on the one or more computer-readable storage media for providing a background save capabilities. The program instructions, when read and executed by the processing system, direct the processing system to receive, from an application accessed on a client device, a request to save a record and determine that the request is subject to a background save operation. Upon determining that the request is subject to the background save operation, the program instructions direct the processing system to commence, in a background thread, a save of the record to a database and complete the save of the record to the database using the background thread.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
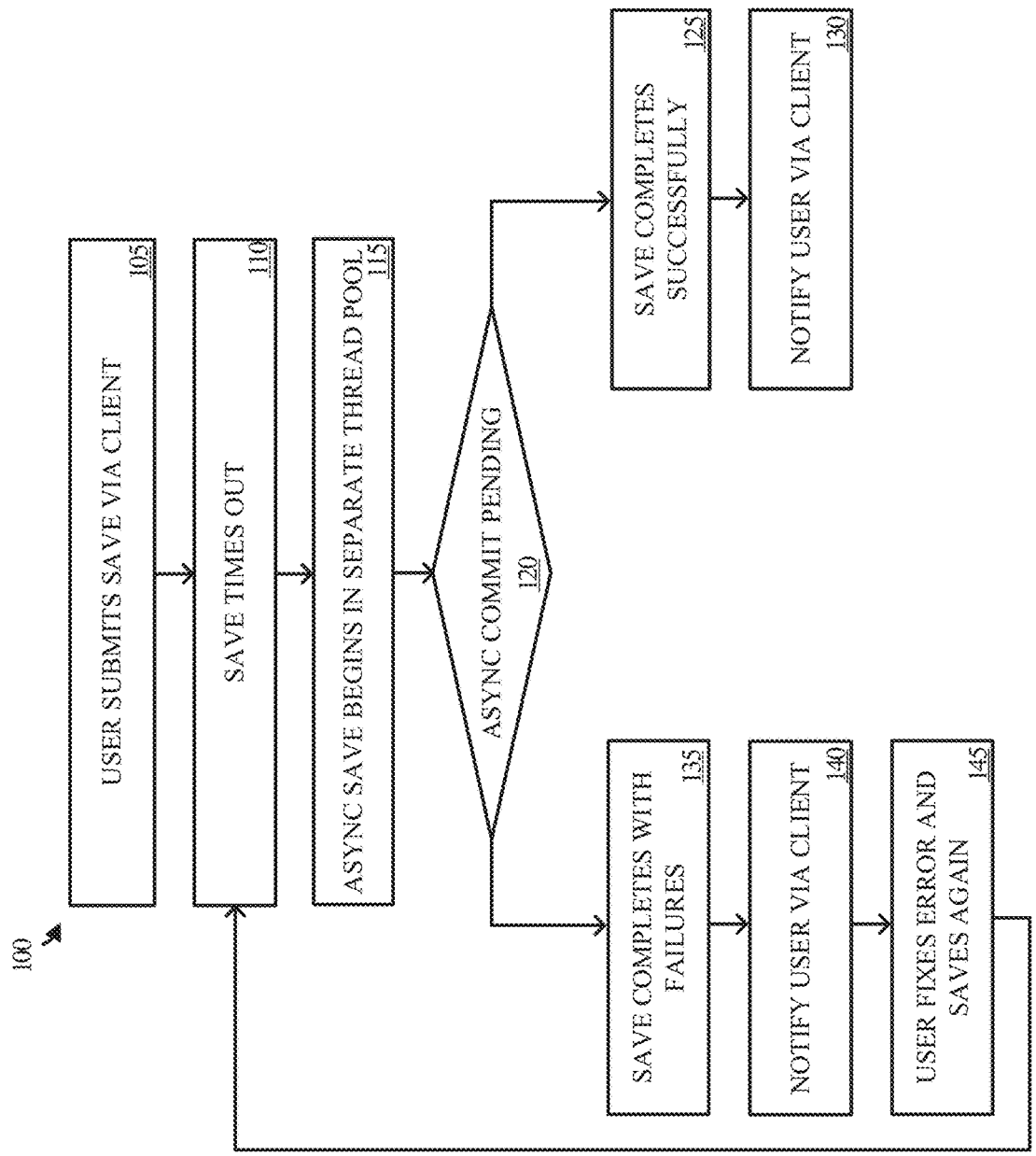
FIG. 1 is a flowchart illustrating a series of steps for asynchronous fallback save operations in accordance with some embodiments of the present technology.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Some aspects of the present technology generally relate to systems and methods for implementing and configuring an asynchronous fallback save operation. More specifically, the technology relates to a means for saving large transactions or records to a database from an application without needing to complete the save before a timeout of the connection between the client and the server. In accordance with the present technology, a user may submit a request to save a record to a database from a client device, wherein the record is too large to complete within the timeout window between the client and the server (e.g., 30 seconds). Thus, after the user submits a request from the client to the server to save a record, the server may transfer the save operation to a background thread pool (i.e., a separate thread pool) in which the server can save the record to the database even after the connection between the client and the server is lost. In some examples, upon saving to the database, the first thread pool (i.e., the thread used before opening the background thread pool) may notify the user on the client that the record will continue saving in the background and that the user may exit the page, move on to a new task, or the like. Upon completion, the server may send a notification back to the client (e.g., through a Web Socket) notifying the user when the save operation has completed. In certain embodiments, the user may be notified that the save completed successfully or that the save completed with errors.

The asynchronous fallback save operation (also referred to herein as a background save) provides a means for saving very large transactions from a client device within a stateless architecture. Examples herein are described in the context of a software as a service (SaaS) platform, or a similar form of a stateless architecture. When dealing with transactions having hundreds or thousands of lines (or more) of detail, it may take an extraordinarily long amount of time to process those records—so long that the connection between the server and the client may time out. Thus, after the server begins to process a large entry, the connection may time out, causing the user and the server to lose all work or progress that was being saved. For example, a browser connection to a server may time out after 30 seconds (or a different time depending on browser configuration). At that point, if the save has not completed, a user may lose all work, data corruption may result, or a similar negative result may occur. Thus, the present technology may prevent this "time out" problem while simultaneously allowing users to continue working on something else while a save is still completing, thereby decreasing delay associated with saves and limiting workflow interruption associated with saving large datasets. In some implementations, once a user has submitted a request to save a record, they may continue working on something else in the application, close the window or browser, exit the page, move to a different page, or similarly move to a new task.

Setting, adjusting, or updating configuration data for the asynchronous fallback save operation is facilitated by the disclosed developer tool for the application. A user interface tool may provide an intuitive and user-friendly means for application developers or administrators to provide the customizable configuration data and related parameters for the application. As compared to known systems and methods for implementing and configuring record save request operations for applications, embodiments of the present technology significantly improve workflow efficiencies and user experiences for application users and developers alike. Components, processes, and methods of some embodiments of the present technology include, enable, or otherwise provide additional advantageous benefits and technical effects as compared to known systems and methods.

FIG. 1 is a flowchart illustrating a series of steps (method 100) for performing an asynchronous fallback save in accordance with certain embodiments of the present technology. Method 100 implements asynchronous fallback save operations in order to maintain transaction integrity for a large transaction that takes longer than a client-server connection is maintained. Method 100 may help avoid data corruption or data loss when saving large records or transactions. In step 105, a user submits a save via a client device. Upon the submission of a save request, a save initiates in a first thread pool. In one embodiment, the client device is a computer running an application in a web browser, wherein the application includes asynchronous fallback save functionality. In the present example, submitting a save includes requesting to save a very large transaction or record. Transactions or records, in accordance with the present technology, may include sales orders, journal entries, financial ledgers, or financial debits or credits, as just a few examples.

In step 110, the asynchronous fallback save (i.e., async save) timer expires. In an embodiment, when the asynchronous fallback save functionality is enabled in the application, a timer may begin when a save request is submitted, as in step 105, wherein the save operation will transfer to async save mode upon expiration of the timer. For example, the async save timer may be set to 25 seconds, because the connection between the browser and the server automatically times out after 30 seconds if the browser has not yet received a response from the server. The async save timer may be set to expire after any amount of time, both longer and shorter than 25 seconds as provided in this example. Ordinarily, without inclusion of the asynchronous fallback save operation as described herein, the state of the transaction (i.e., the save) is maintained by the client—the client opens and maintains a transaction boundary in which the save occurs. Thus, if the transaction times out, the client has no way to return to the transaction, handle the transaction boundary, close the transaction, or commit it to memory. Thus, if a save completes before expiration of the timer, the save will complete as normal in the original thread pool without transitioning into an async save mode. However, if the async save timer times out before completion of the save, a new transaction boundary is created and the async save initiates in a background thread pool in step 115. Once the save has initiated in a background thread pool, the operation no longer depends on maintaining a connection between the client and the server, and the server may continue writing to the database even after the connection between the timer and the server times out. Thus, once the new thread pool has been recruited and the async save is initiated, the client and the server may be disconnected without interrupting the save operation. At this time, the original thread pool may return back to the client running the application while the background thread pool continues the save.

In step 120, the async save continues in the background thread pool. Step 120 includes the server continuing to write the transaction to the database in the background thread pool, while the client can run and operate the application as normal in the original thread pool. The save then completes in the background thread pool in either step 125 or step 135. In step 125, the save completes successfully with no errors. Following successful completion, a notification is sent back to the client in step 130. In one embodiment, the real-time notification is sent back to the application running in a browser on the client device via a Web Socket.

Alternatively, in step 135, the save completes with one or more errors. Upon successful completion, a notification is sent back to the client in step 140. In one embodiment, the real-time notification is sent back to the application running in a browser on the client device via a Web Socket. Upon notification that the save completed with one or more failures, the user may fix the error and attempt to save the transaction again in step 145.

Submitting a save, as in step 105, may include a user clicking a save button within the application. An application in accordance with one or more embodiments of the present technology may include multiple types of save options. For example, save buttons may include "save and exit," "save and stay," "save and add another," "save and add new," and/or "save and return." In an embodiment, the application includes all five of the aforementioned save type functionalities. A "save and exit" save type sends the user back to the list view. A "save and stay" save type will leave the user on the page from which they initiated the save. If the save completes before the time out, the transaction will save as normal and stay on the page that the user was on, reflecting the updated record. A "save and add another" save type sends the user back to the screen that they submitted the save from. If the save completes before timeout, a new record is created with the same information as the original record. A "save and add new" save type allows the save to go into async save mode and then create a fresh record. A "save and return" save type notifies the user that the save has gone into async and then returns to the normal list. In addition to these five save type functionalities, an application with async save functionality may additionally include save type functionalities such as "save for later" and "auto save."

Figure 2:
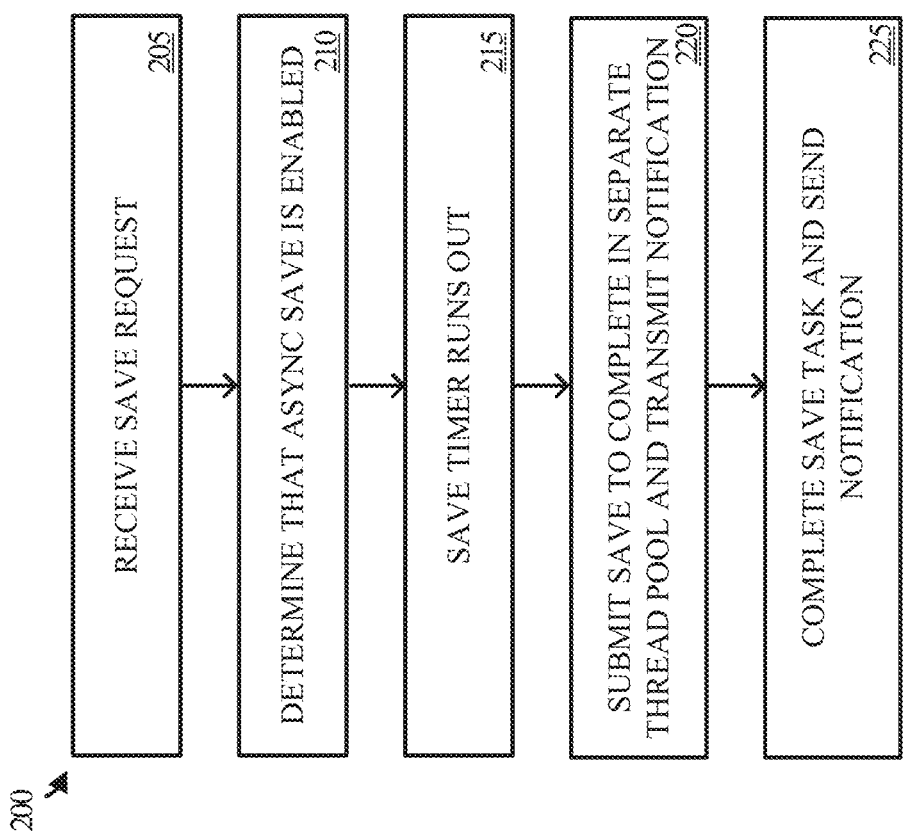
FIG. 2 is a flowchart illustrating a series of steps performed on the server side for asynchronous fallback save operations in accordance with some embodiments of the present technology.

FIG. 2 is a flowchart illustrating a series of steps (method 200) that may be performed by a server during an asynchronous fallback save in accordance with certain embodiments of the present technology. In step 205, the server receives a request to save a transaction from a client device. Upon receiving the save request, the server determines that async save is enabled in step 210. Upon determining that async save is enabled, the server then determines that the async save timer has expired in step 215. Alternatively, if the save completes before expiration of the async save timer, the server does not continue past step 210. However, if the transaction is very large and the save therefore does not complete before expiration of the async save timer, a new thread pool is spun up in which the save may complete in step 220. At this step, a new transaction boundary is created so that the client can return to the application without needing to maintain the original transaction boundary for the save. Additionally, in step 220, the server may transmit a notification to the client, wherein the notification may inform a user that the save operation has gone into background save or async save mode, at which point the user may be sent back to another view of the application. Finally, in step 225, the save completes, and the server sends a notification back to the client. Step 225 may include the save completing successfully or completing with failures. The notification sent back to the client may include detail regarding whether the save successfully completed or not.

Figure 3:
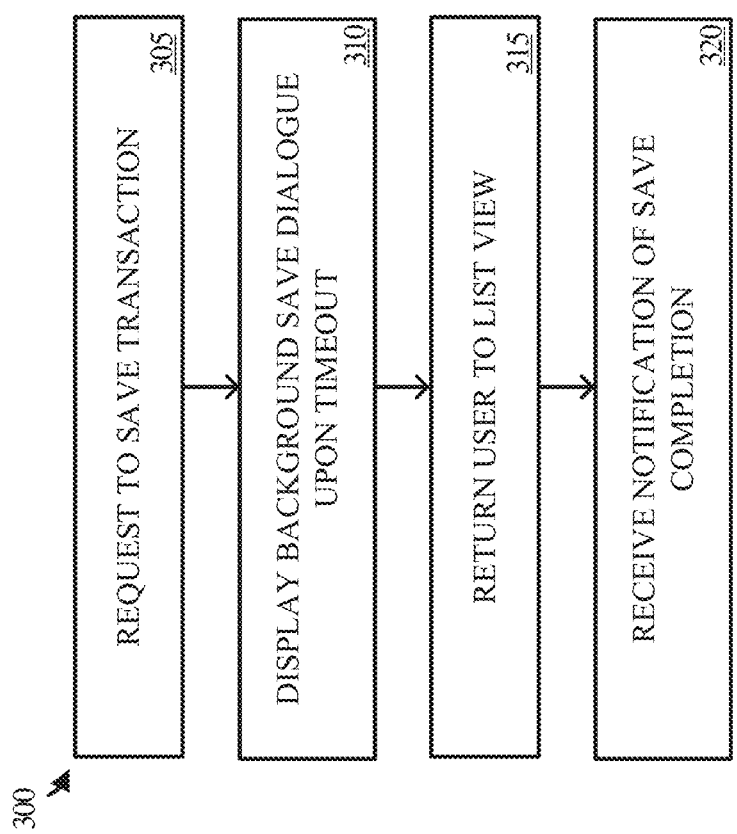
FIG. 3 is a flowchart illustrating a series of steps performed on the client side for asynchronous fallback save operations in accordance with some embodiments of the present technology.

FIG. 3 is a flowchart illustrating a series of steps (method 300) that may be performed by a client during a background save (i.e., asynchronous fallback save) in accordance with certain embodiments of the present technology. In some embodiments, the client includes an application running on a personal computing device, such as a desktop computer, a laptop computer, a tablet, a smartphone, or similar computing device. In certain examples, the application is running in a browser on the personal computer device. In step 305, the client submits a request to save a transaction. Step 305 may be performed in response to the selection of a "save" option in the application. Next, in step 310, the save timer expires after a configured amount of time. Upon expiry of the save timer, the client displays a dialogue in the application informing a user that the save will continue in the background (i.e., save has gone async). The save timer may be configurable via the application. In some examples, the save timer may be set to any time less than 30 seconds, because 30 seconds is the standard length of time in which a browser will disconnect from a server if no response is received. Upon producing the background save dialogue, the application then returns to another view of the application, such as list view, in which the user may optionally continue working on another task. At a later time, in step 320, the client receives a notification that the save completed in the background. In some examples, the notification is sent back to the client via a Web Socket.

Figure 4:
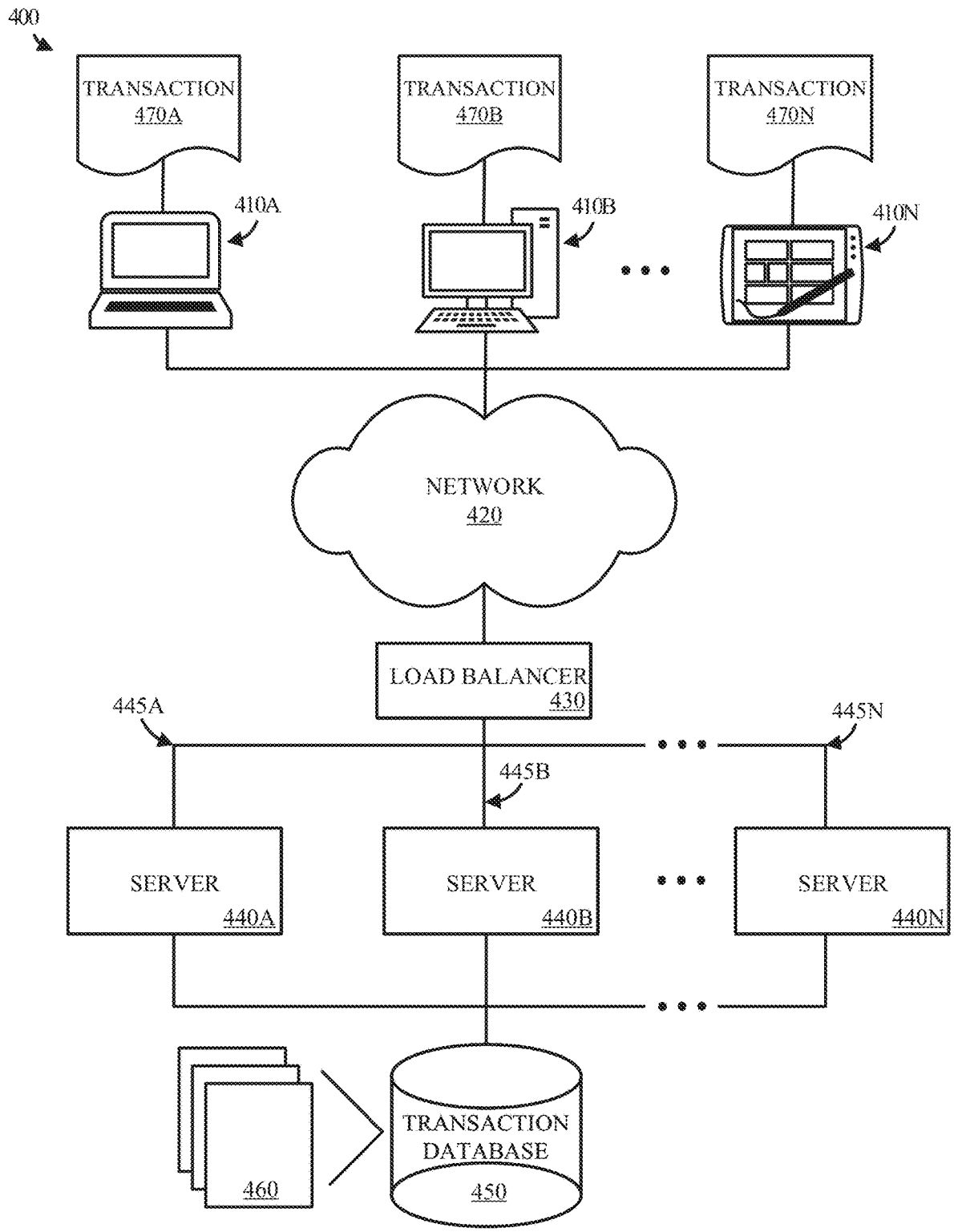
FIG. 4 illustrates an example of an operating environment in which some embodiments of the present technology may be utilized.

FIG. 4 illustrates an example of operating environment 400 in which some embodiments of the present technology may be utilized. Operating environment 400 may include one or more applications running on client devices 410A-410N (e.g., a mobile phone, tablet computer, mobile media device, mobile gaming device, vehicle-based computer, wearable computing device, etc.), network 420, load balancers 430, servers 440A-440N, and transaction databases 450 having entries 460 created in response to transactions 470A-470N. Applications accessed via client devices 410A-410N can be large scale enterprise applications capable of performing large scale complex transactions in a stateless manner. As such, these large-scale complex transactions can be instantly handed off and/or picked up by another server for any reason (e.g., load balancing, server failures, etc.).

In accordance with various embodiments, client devices 410A-410N can include a variety of network communication components that enable client devices 410A-410N to communicate with remote servers 440A-440N or other portable electronic devices by transmitting and receiving wireless signals using licensed, semi-licensed or unlicensed spectrum over a communications network. In some cases, the communications network may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. In accordance with various embodiments, load balancers 430 can run in a stateless mode so that any client session or client device, connected by way of browsers, for example, to servers 440A-440N via a plurality of threads (or thread pools) 445A-445N, has no affinity to a particular server 440A-440N. This lack of server affinity is the result, at least in part, of the unique signaling protocol between client devices 410A-410N and remote servers 440A-440N used in various embodiments to automatically record session activity.

Servers 440A-440N can host applications which can be accessed via client devices 410A-410N. In accordance with various embodiments, these applications and servers can provide a variety of features including, but not limited to, behind the scene monitoring activity (transaction or business) and recording, persisting client activity, ubiquitous autosave, business workflow and approval lifecycles, error correction at the business level, management of the state of the transaction without the user having to manage the activity, tracking posted and unposted transactions (e.g., business state), and the like. The applications can communicate with a unified transaction engine that combines awareness of database transaction state along with business transaction states. As a result, the end-user and/or developer do not have to be concerned about the underlying differences between the database transaction state and business transaction states and can focus on where their transaction is in its lifecycle. As users interact with the application, the system can monitor, track, and/or record the states and other transactional data in transaction database 450.

Figure 5:
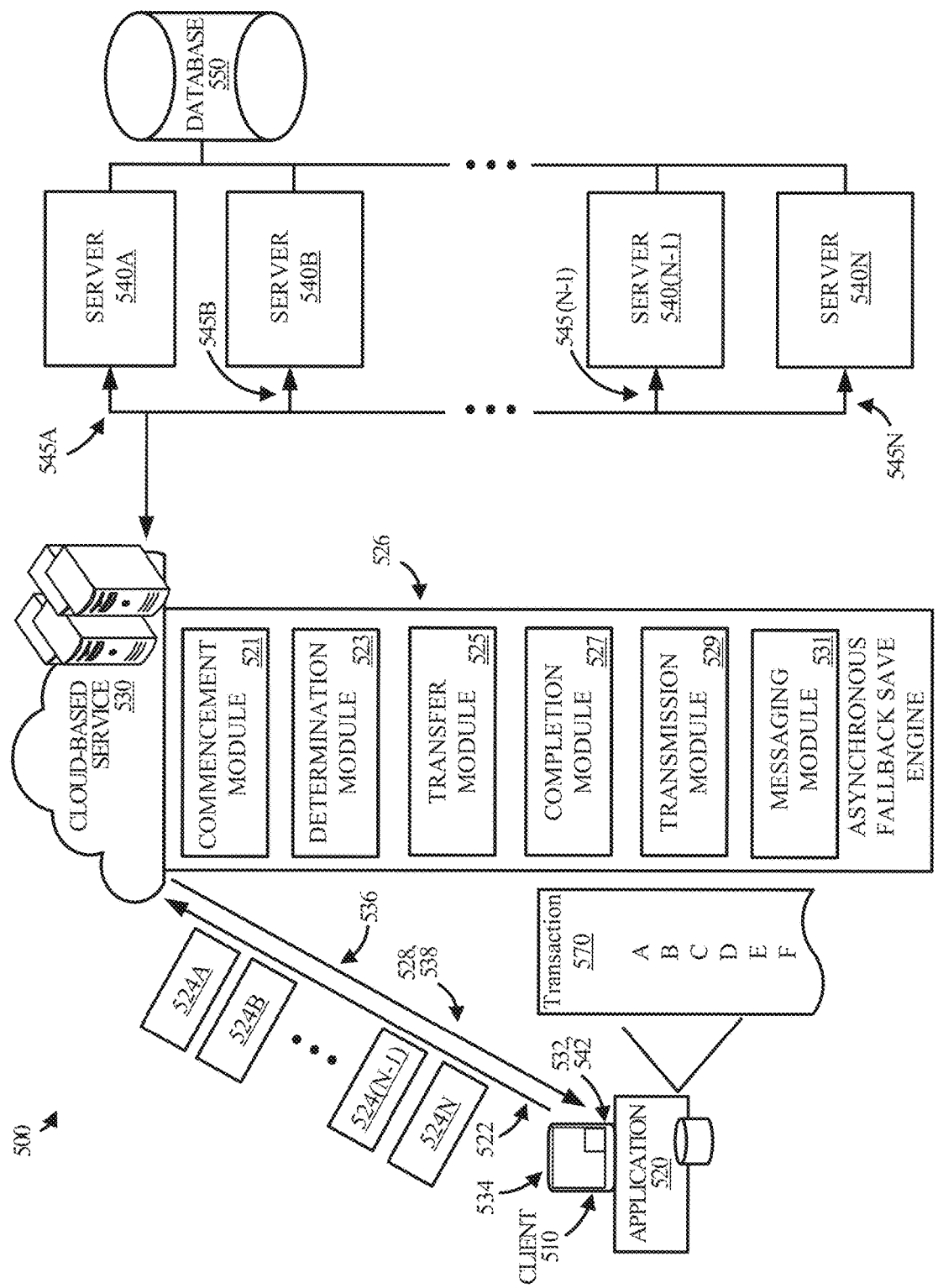
FIG. 5 illustrates a set of components that may be used to implement a system for enabling an asynchronous fallback save operation for an application running on a client device according to one or more embodiments of the present technology.
Figure 6:
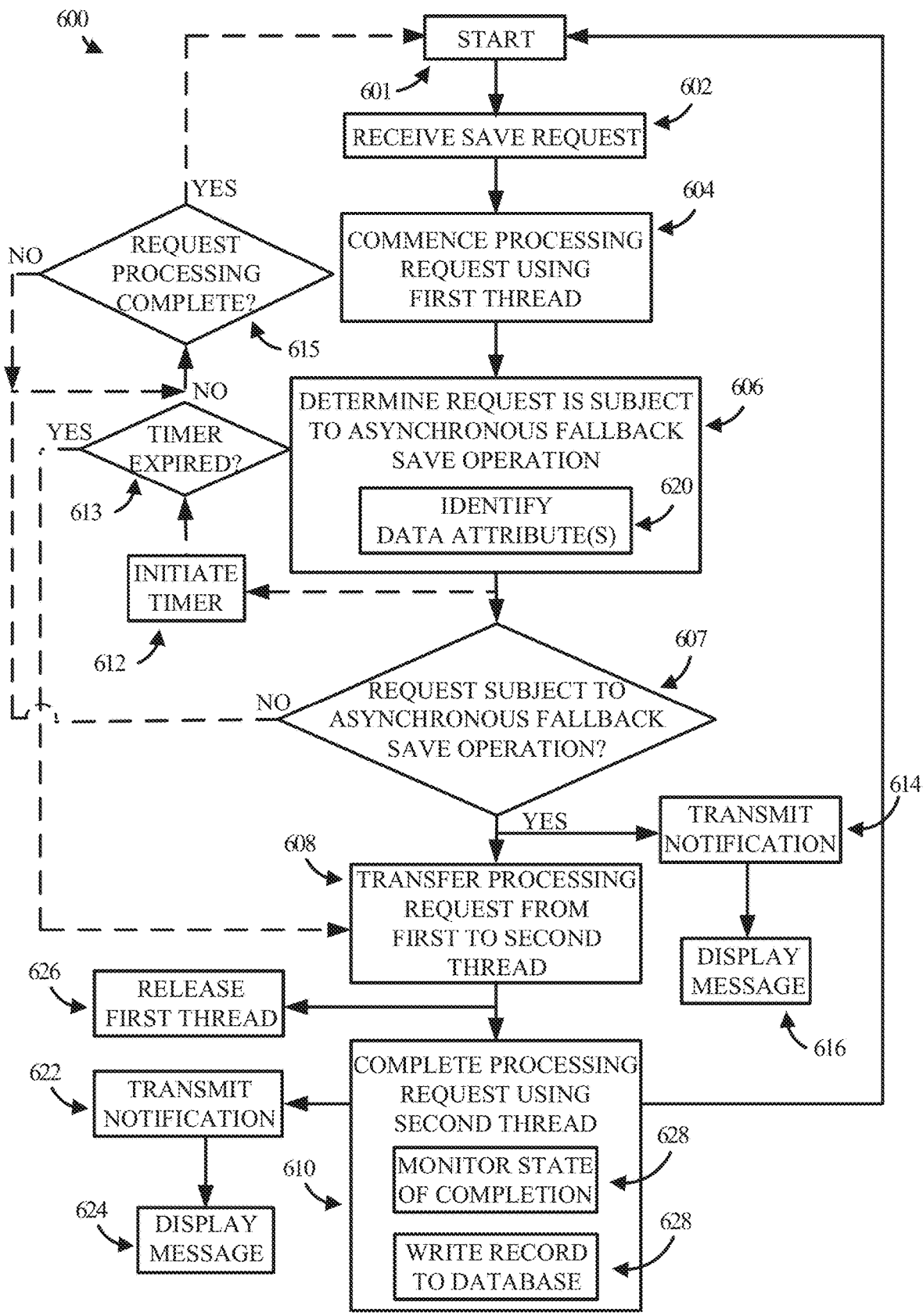
FIG. 6 illustrates is a flowchart illustrating a set of operations of a method for implementing the asynchronous fallback save operation for the application according to one or more embodiments of the present technology.

FIG. 5 illustrates a set of components that may be used to implement a system 500 enabling an asynchronous fallback save operation for an application 520 running on a client device 510 according to one or more embodiments of the present technology. FIG. 6 is a flowchart illustrating a set of operations of a method 600 for implementing the asynchronous fallback save operation for application 520 according to one or more embodiments of the present technology. Client device 510 can run one or more applications 520 (e.g., customized enterprise applications, word processing applications, e-mail applications, spreadsheet applications, etc.) that can transmit requests 522 to save at least one record 524A-524N. A user can be creating transaction 540 on application 520. To facilitate transaction 570 creation and editing, application 520 can include a variety of functionality including GUIs running on client device 510 (e.g., a PC, mobile phone device, a Web server, or other application servers). Such devices and systems may employ one or more virtual machines, containers, or any other type of virtual computing resource. Records 524A-524N may be related to transactions 470A-470N manipulated or otherwise handled by an application 520 user. Save requests 522 may be submitted to a cloud-based service 530 or to one or more of servers 440A-440N. Service 530 can be representative of any service providing shared access to cloud-based or centralized applications, communication, content, and centralized storage. In some embodiments, one or more of servers 440A-440N can be embodied in, or otherwise implemented by, service 530. Service 530 (or server(s) 440) can include an asynchronous fallback save engine 526 that is capable of performing, implementing, or otherwise facilitating at least some of the processes of the asynchronous fallback save operation to achieve any of the several technical and user experience benefits described herein.

Referring to FIGS. 5 and 6, service 530 may include at least one processor and at least one memory device coupled in communication with the processor(s). While not shown in FIG. 5, memory device(s) can be any device, mechanism, or populated data structure used for storing information. In accordance with some embodiments of the present technology, memory device(s) can encompass, but is not limited to, any type of volatile memory, nonvolatile memory, and dynamic memory. Non-volatile memory may also be referred to herein as non-transient computer readable media. For example, the memory can be random access memory (RAM), memory storage devices, optical memory devices, media magnetic media, magnetic tapes, hard drives, SDRAM, RDRAM, DDR RAM, erasable programmable read-only memories (EPROMs), electrically erasable programmable read-only memories (EEPROMs), compact disks, DVDs, and/or the like. In accordance with some embodiments, the memory may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory. Memory device(s) may be used to store instructions for running one or more applications or modules on one or more system 500 processor(s) (not shown). For example, the memory device(s) could be used in one or more embodiments to house all or some of the instructions needed to execute at least a portion of the functionality of asynchronous fallback save engine 526.

Service 530 may also include a communications interface coupled in communication with the processor(s). The communications interface enables or otherwise facilitates receipt by service of requests 522 from application 520 accessed on client device 410. Processor(s) of system 500 may be connected with application 520 and/or client device 410 by way of a web socket for application 520 using a web browser for user interactions. In some examples, memory device(s) include non-transitory computer readable media storing program instructions (e.g., software or firmware) as modules which together comprise, at least in part, the asynchronous fallback save engine 526. System 500 components or modules of asynchronous fallback save engine 526 can be embodied as special-purpose hardware (e.g., one or more ASICS, PLDs, FPGAs, or the like), or as programmable circuitry (e.g., one or more microprocessors, microcontrollers, or the like) appropriately programmed with software and/or firmware, or as a combination of special purpose hardware and programmable circuitry. Other embodiments of the present technology may include some, all, or none of these modules and components along with other modules, applications, and/or components. Still yet, some embodiments may incorporate two or more of these modules and components into a single module and/or associate a portion of the functionality of one or more of these modules with a different module.

In some embodiments, requests 522 to save record(s) 524 may be transmitted from application 520 to one or more of servers 440, either instead of, or in addition to, service 530. In such embodiments, at least one of the servers 440 includes processor(s), memory device(s) and communication interface, where server 440 memory device(s) may include non-transitory computer readable storage media that store program instructions for at least some of the modules of asynchronous fallback save engine 526 for use by system 500 in method 600. A connection 536 between processor(s) and application 520 or client device 410 may be a stateless connection.

As implemented, for example, by system 500, method 600 begins at a start state 601 in which client device 510 and application 520, along with service 530 (or server(s) 440), are performing any of a number of useful processes other than those pertaining to processing a request 522 to save record(s) 524. From start state 601, and upon receiving 602 a request 522, service 530 (or server(s) 440) commences 604 processing the request 522 using a first thread (e.g., 445A) or thread pool. In an example, a user can click on a save button in application 520 to initiate transmission of, and receipt 602 by processor(s), or request 522 in method 600.

In an embodiment, program instructions of a commencement module 521 of asynchronous fallback save engine 526 executed by processor(s) cause system 500 and/or its processor(s) to perform, implement or otherwise facilitate the commencing 604 step of method 600.

After commencing 604 processing of request 522 using first thread 445A, service 530 determines 606 whether or not request 522 is subject to the asynchronous save operation. The determining 606 step may be performed while processing of request 522 is taking place in method 600. In an embodiment, program instructions of a determination module 523 of asynchronous fallback save engine 526 executed by processor(s) cause system 500 and/or its processor(s) to perform, implement or otherwise facilitate the determining 606 step of method 600. In an example, the determining 606 step of method 600 may include processor(s) identifying 620 at least one data attribute of the request 522 or record(s) 524 indicating that request 522 is subject to the asynchronous fallback save operation. These data attributes may include attributes such as a size of record(s) 524, metadata or flags contained in record(s) 524 or request(s) 522, and/or selected bit(s) in a signal encoding data representative of request 522. As further described below with reference to FIGS. 4 and 5, these data attributes may be specified by an application 520 developer as part of an "opt-in" specification for the asynchronous fallback save operation for particular types of records 524 or requests 522, or for request(s) 522 or record(s) 524 originating from a particular user or user group.

For the determining 606 step, method 600 includes a logical branch 607. If processor(s) determine 606 that request 522 is not subject to the asynchronous save operation, then request 522 processing proceeds using first thread 445A and method 600 proceeds to a logical branch 615. In logical branch 615, processor(s) may monitor system 500 for completion of request 522 using first thread 445A and, upon completion, return system 500 to start state 601. Upon completing processing request 522 using first thread (e.g., 445A), an application 520 user may be notified by way of a message indicating that record(s) 524 are saved.

In logical branch 607, if processor(s) determine 606 that request 522 is subject to the asynchronous save operation, then method 600 proceeds to a transferring 608 step. For the transferring 608 step, processor(s) transfer processing of request 522 from first thread 445A to a second thread (e.g., any of 445B, . . . , 445(N-1) and 445N) or thread pool, where second thread 445 is different from first thread 445. In an embodiment, program instructions of a transfer module 525 of asynchronous fallback save engine 526 executed by processor(s) cause system 500 and/or its processor(s) to perform, implement or otherwise facilitate the transferring 608 step of method 600. In an example, the transferring 608 step may include transferring 608 request 522 processing from a first server (e.g., 440A) associated with the first thread 445A (or thread pool) to at least a second server (e.g., one or more of 440B, . . . , 440(N-1), and 440N) associated with at least the second 445B, but not the first 445A, thread (or thread pool). The second thread (e.g., 445B) or thread pool may not be subject to the aforementioned "time out" problem and thus may advantageously provide continuity of processing the save request 522 to completion in method 600. Likewise, the second thread (e.g., 445B) or thread pool may be configured or configurable by application 520 developers or administrators specifically to be more reliable or otherwise better suited for "large" save requests such as those representing transaction operations by users involving hundreds, thousands or more rows of a data table.

In one embodiment, determining 606 whether or not request 522 is subject to the asynchronous fallback save operation may include initiating 612 the hardware or software-implemented timer in method 600. In this embodiment, the initiating 612 step occurs prior to, and instead of, logical branch 607, and method 600 proceeds to a logical branch 613 where processor(s) monitor system 500 for an expiration of a predetermined timer duration. If processor(s) determine that timer expires in logical branch 613 prior to completion of request 522 processing using first thread 445, then method 600 proceeds to transfer 608 processing of request 522 to the second thread 445B. Otherwise, method 600 proceeds to logical branch 615, as described above.

In another embodiment, the initiating 612 step and its associated logical branch 613 occur in method 600 in response to processor(s) determining 606 that request 522 is subject to the asynchronous fallback save operation in logical branch 607. In either of the two aforementioned embodiments of method 600, for example, the transferring 608 step may be performed in the absence of initiating any timers for the second thread 445B (or thread pool). Transferring 608 processing of request 522 from first 445A to second thread 445B may further include releasing 626 first thread 445A from request 522 to facilitate commencing 604 processing of a subsequent request 522 to save another record 524 (or records 524) using first thread 445A.

Processor(s) may employ communication interface of system 500 to transmit 614, via application 520, a notification 528 to client device 510 upon determining 606 that request 522 is subject to the asynchronous fallback save operation. In an embodiment, program instructions of a transmission module 529 of asynchronous fallback save engine 526 executed by processor(s) cause system 500 and/or its processor(s) to perform, implement or otherwise facilitate the transmitting 614 step of method 600. In method 600, notification 528 can be transmitted 614 to application 520 and/or client device 510 using the first thread 445A (or thread pool). In an example, program instructions of a messaging module 531 of asynchronous fallback save engine 526 further cause system 500 and/or its processor(s) to display 616 a message 532 to an application 520 user on a display device 534 of client device 510. For instance, upon determining 606 that request 522 is subject to the asynchronous fallback save operation in method 600, a pop-up message 532 may be shown in the lower right-hand corner of display device 534. Message 532 may indicate that the asynchronous fallback save operation is running and in progress, and may also tell user that they may continue to work on something else in application 520 in the meantime. Thus, minimal to no interruption to users' workflow in application 520 is introduced and the asynchronous save operation proceeds seamlessly from the perspective of the user.

Upon the transfer (608) of request 522 processing from first (e.g., 445A) to second (e.g., 445B) thread, method 600 proceeds to completing 610 processing request 600 using second thread (e.g., 445B). Completing 610 processing of request 522 may include writing 618 record(s) 524 to database 450. In an embodiment, program instructions of a completion module 527 of asynchronous fallback save engine 526 executed by processor(s) cause system 500 and/or its processor(s) to perform, implement or otherwise facilitate the completing 610 step of method 600.

No interruption in application 520 workflow processes is noticed by the user thereof, and any of the aforementioned "timeout" interruptions are prevented or minimized. For example, in method 600, the commencing 604 step may proceed using a first system 500 processor, and request 522 can be completed 610 using a second system 500 processor different from the first processor. Method 600 implemented by, for example, system 500, represents a substantial improvement over known systems and methods in terms of both resource utilization efficiency and user experience.

System 500 processor(s) may employ communication interface to transmit 622, via application 520, a notification 538 to client device 510 upon completing 610 request 522 using at least the second thread (e.g., 445B). In an embodiment, program instructions of transmission module 529 of asynchronous fallback save engine 526 executed by processor(s) cause system 500 and/or its processor(s) to perform, implement or otherwise facilitate the transmitting 622 step of method 600. In method 600, notification 538 can be transmitted 614 to application 520 and/or client device 510 using either the first 445A or second (e.g., 445B) thread (or thread pool). System 500 processor(s) may monitor 628 request 522 processing using second thread (e.g., 445B) to determine a state of completion of request 522. In an example, program instructions of the messaging module 531 of asynchronous fallback save engine 526 further cause system 500 and/or its processor(s) to display 624 a message 542 to an application 520 user on display device 534 of client device 510. For instance, upon determining that request 522 completed 610 processing using second thread (e.g., 445B), a pop-up message 542 may be shown in the lower right-hand corner of (or elsewhere on) display device 534. Message 542 may include text that informs application 520 user them that request 522 processing is complete. Message 542 may also include an indication of whether request 522 processed using the asynchronous fallback save operation was successful or not, and may further provide information (or a link to information) with details of the completion status of request 522.

Figure 7:
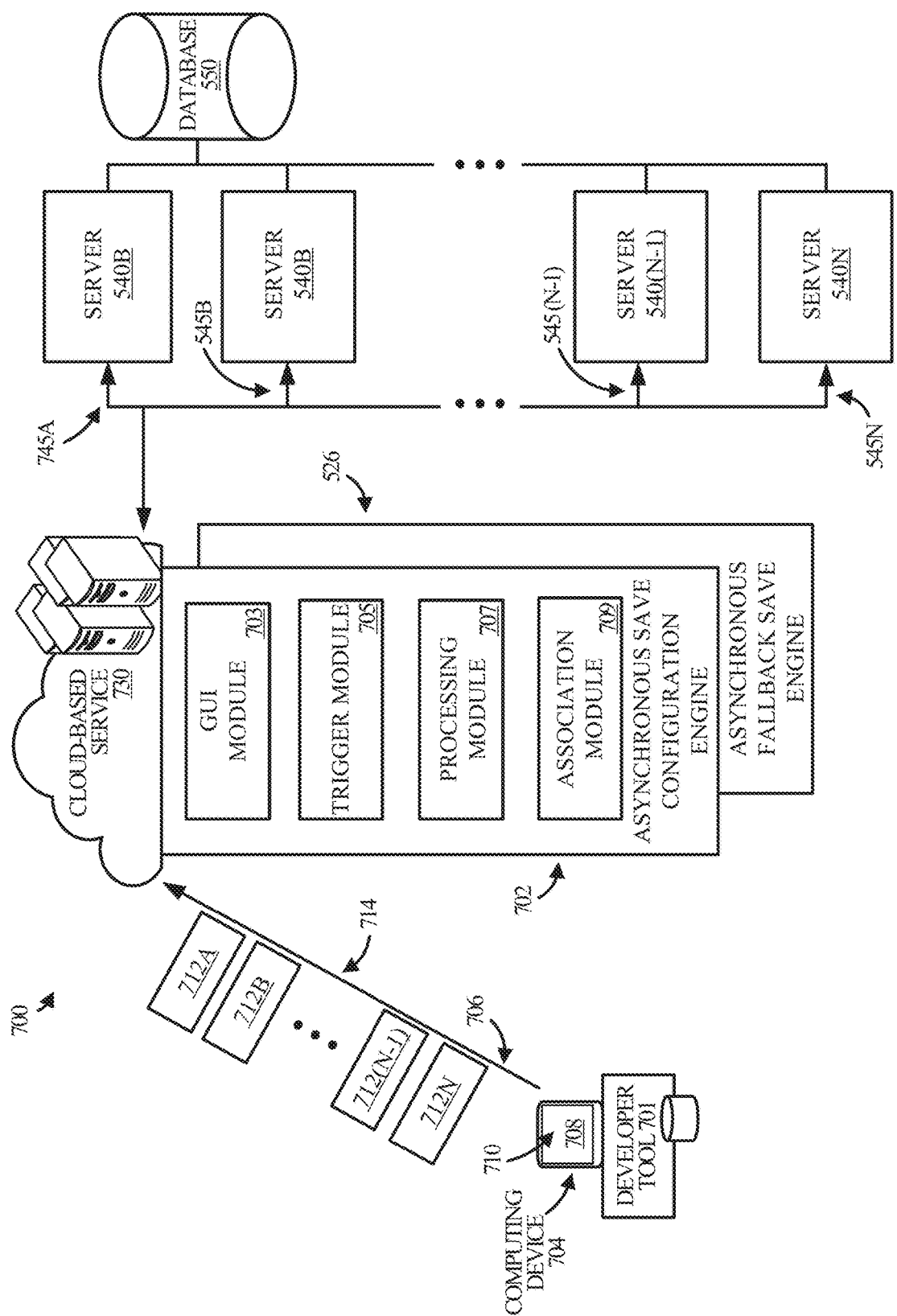
FIG. 7 illustrates a set of components that may be used to implement a system for configuring an asynchronous fallback save operation for an application according to one or more embodiments of the present technology.
Figure 8:
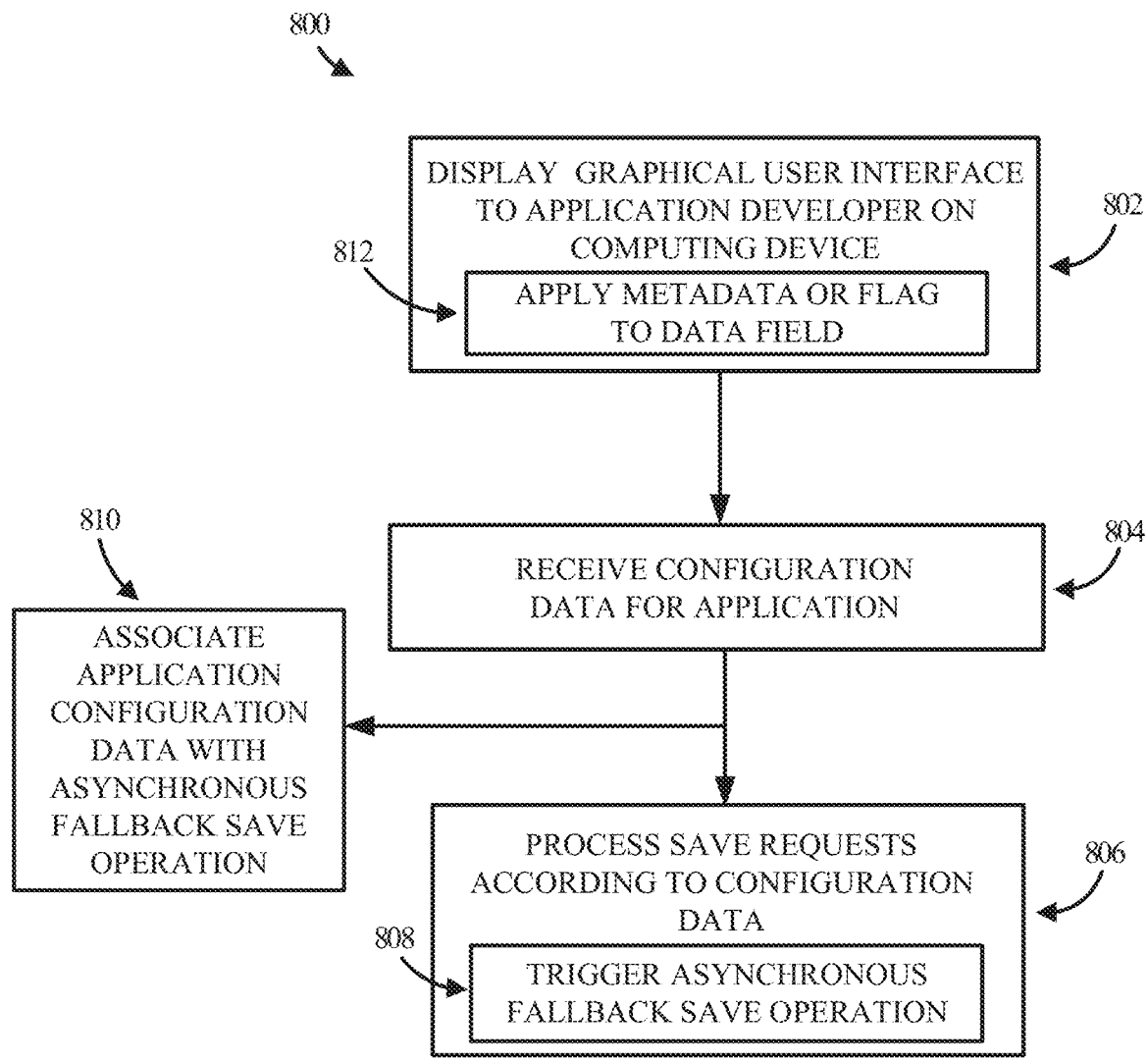
FIG. 8 illustrates is a flowchart illustrating a set of operations for configuring an asynchronous fallback save operation according to one or more embodiments of the present technology.

FIG. 7 illustrates a set of components that may be used to implement a system 700 enabling configuring the asynchronous fallback save operation for application 520 according to one or more embodiments of the present technology. FIG. 8 is a flowchart illustrating a set of operations of a method 800 for configuring the asynchronous fallback save operation according to one or more embodiments of the present technology. System 700 can share several of the components, connections and other features described above for system 500 with reference to FIGS. 5 and 6 (e.g., communication interface, servers 440, service 530, processor(s) and memory device(s)). A computing device 704, which may take any of the aforementioned forms of client device 510, can run an application 520 developer tool 701 that facilitates entry of configuration settings by an application 520 developer (or administrator) and transmission of application 520 configuration data to service 530 and/or server(s) 440 of operating environment 400. To facilitate such operations in method 800, developer tool 701 can include a variety of functionality including one or more GUIs 708 displayed to the developer on a display device 710 of computing device 704.

Configuration data 706 may include one or more metadata designations 712A-712N for submission to service 530 or to one or more of servers 540A-540N. Service 530 may take the form, and share at least some of the functions, of service 530 as described above with reference to FIGS. 5 and 6, including asynchronous fallback save engine 526. Additionally, service 530 can include an asynchronous save configuration engine 702 that is capable of performing, implementing, or otherwise facilitating at least some of the processes of method 800 using, for example, system 700, to achieve the several technical and user experience benefits described herein. As with system 500, memory device(s) in communication with system 700 processor(s) could be used in one or more embodiments to house all or some of the instructions needed to execute at least a portion of the functionality of asynchronous save configuration engine 702.

Service 530 may also include a communications interface enables or otherwise facilitates receipt by service of configuration data 706 from developer tool 701 accessed on computing device 704. Processor(s) of system 700 may be connected with developer tool 701 and/or computing device 704 by way of a web socket for developer tool 701 using a web browser. Developer tool 701 may be a developer or an administrator mode of application 520, or it may be a different application altogether. In some examples, memory device(s) include non-transitory computer readable media storing program instructions (e.g., software or firmware) as modules which together comprise at least a portion of asynchronous save configuration engine 702. System 700 components or modules of asynchronous save configuration engine 702 can be embodied as special-purpose hardware (e.g., one or more ASICS, PLDs, FPGAs, or the like), or as programmable circuitry (e.g., one or more microprocessors, microcontrollers, or the like) appropriately programmed with software and/or firmware, or as a combination of special purpose hardware and programmable circuitry. Other embodiments of the present technology may include some, all, or none of these modules and components along with other modules, applications, and/or components. Still yet, some embodiments may incorporate two or more of these modules and components into a single module and/or associate a portion of the functionality of one or more of these modules with a different module.

In some embodiments, configuration data 706 may be transmitted from developer tool 701 to one or more of servers 540, either instead of or in addition to service 530. In such embodiments, at least one of the servers 540 includes processor(s), memory device(s) and communication interface, where server 540 memory device(s) may include non-transitory computer readable storage media that store program instructions for at least some of the modules of asynchronous save configuration engine 702 for use by system 700 in method 800. In some examples, a connection 714 between processor(s) and developer tool 701 or computing device 704 may be a stateless connection.

As implemented, for example, by system 700, method 800 may begin with service 530 causing GUI 708 to be displayed 802 to developer by way of display device 710. In an embodiment, program instructions of a GUI module 703 of asynchronous save configuration engine 702 executed by processor(s) cause system 700 and/or its processor(s) to perform, implement or otherwise facilitate the displaying 802 step of method 800. In an example, GUI 708 includes data entry means such as, but not limited to, click buttons, slider bars, drop down lists, and data fields that are capable of being used, in conjunction with input/output devices like a keyboard and a mouse, by application 520 developer to enter at least some of the configuration data 706 into developer tool 701.

In method 800, configuration data 706 entered into GUI 708 is next sent from developer tool 701 to, and received 504 by, service 530 (or server(s) 540) via data entry means and communications interface. The configuration data 706 may include at least one metadata designation 712 for at least one record 524 type to trigger 508 the asynchronous fallback save operation described above with reference to FIGS. 5 and 6. In an embodiment, program instructions of a trigger module 705 of asynchronous save configuration engine 702 executed by processor(s) cause system 700 and/or its processor(s) to perform, implement or otherwise facilitate the triggering 808 step of method 800. In an example, the metadata designation(s) 712 can include metadata and/or flag(s) applied 812 by system 700 processor(s) in method 800 to at least data field of a template that application 520 is built over. For instance, such a template may be a table presented to an application 520 user to perform data manipulations or otherwise interact with transactions 770 during use of application 520.

In another example, configuration data 706 specified by application 520 developer may include a timeout value for connection 714 including first thread (e.g., 445A) between system 700 processor(s) and client device(s) 510 having access to application 520. Timeout values for hardware and/or software timers specified by application 520 developer in method 800 can dictate several operational aspects of system 500 and method 600 with respect to the initiating 612 step, as described above with reference to FIGS. 5 and 6. These data attributes of configuration data 706 may also include request 522 attributes such as a size of record(s) 524 and/or selected bit(s) in a signal encoding data representative of request 522. In method 800, metadata designation(s) 712 embodied in forms such as the aforementioned examples may also serve to identify records 524 and types of records 524, as in distinguishing between a sales order and a journal entry, as well as to specifically identify the same, as with document numbers or other identifiers.

In one embodiment of method 800, upon receipt 804 of the application 520 configuration data 706 from developer tool 701, the configuration data 706 may be associated 510 with the asynchronous fallback save operation. In an embodiment, program instructions of an association module 709 of asynchronous save configuration engine 702 executed by processor(s) cause system 700 and/or its processor(s) to perform, implement or otherwise facilitate the associating 810 step of method 800. The associating 810 step of method 800 may include providing the configuration data 706 to modules of the asynchronous fallback save engine 526, such as storing the configuration data 706 in memory device(s) for use as parameters or variables called or otherwise utilized by program instructions of the modules of engine 526.

Method 800 then proceeds to processing 806 requests 522 (e.g., requests 522 received 602 in method 600 as described above with reference to FIGS. 5 and 6) according to the received 504 configuration data 706 for application 520. In an embodiment, program instructions of a processing module 707 of asynchronous save configuration engine 702 executed by processor(s) cause system 700 and/or its processor(s) to perform, implement or otherwise facilitate the processing 806 step of method 800. Where configuration data 706 associated 810 with the asynchronous fallback save operation triggers 808 that operation in method 800, processing of a respective request 522 may proceed according to the associated steps described for method 600 after an affirmative determination 606, or equivalent result.

Figure 9:
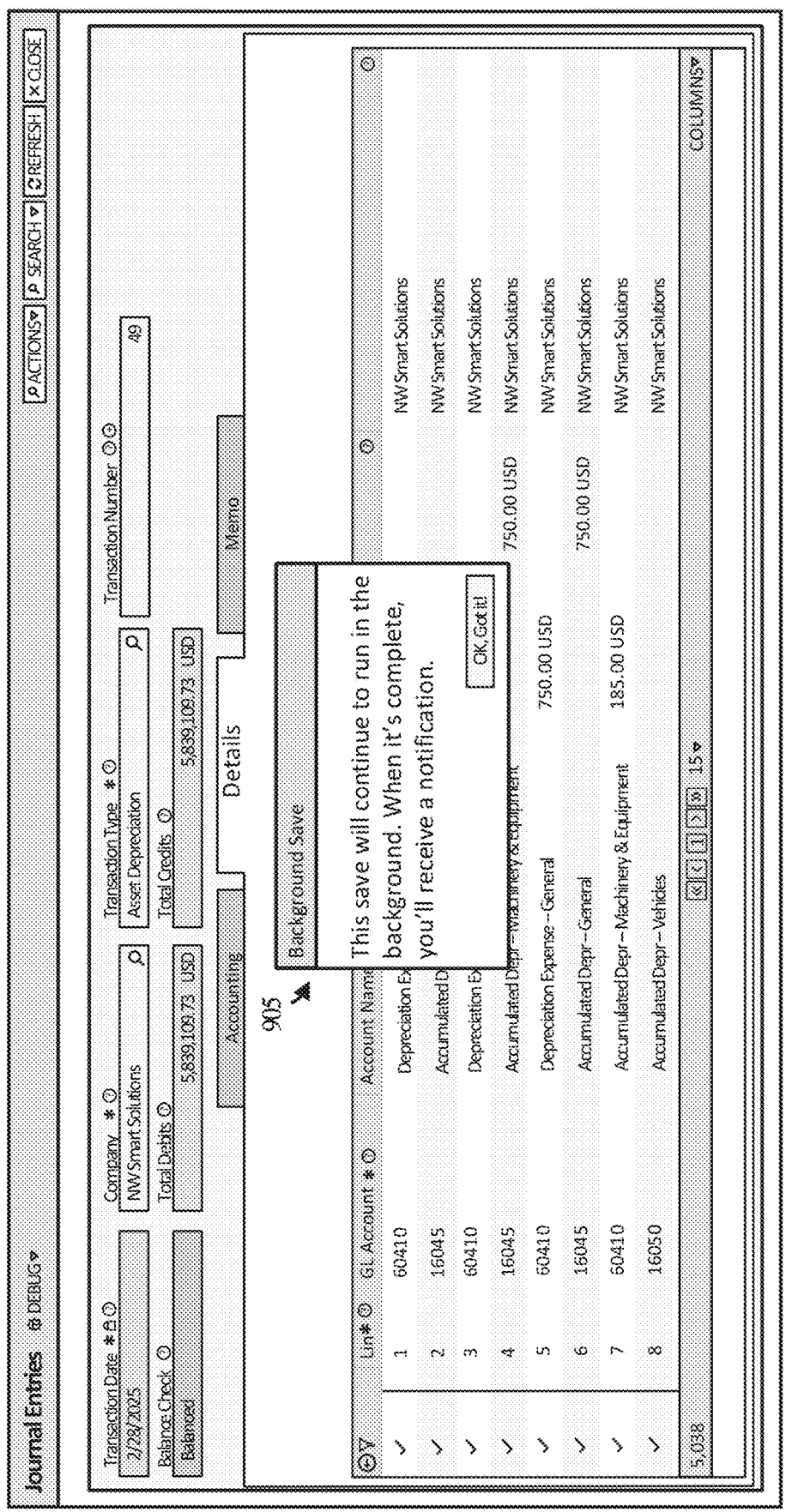
FIG. 9 illustrates an example of a user interface environment that notifies a user when a save has transferred into an asynchronous fallback save in accordance with some embodiments of the present technology.

FIG. 9 illustrates an example of a user interface environment in which certain embodiments of the present technology may be utilized. FIG. 9 illustrates user interface environment 900, including the graphical user interface (GUI) of an application that includes background save functionality as described herein. User interface environment 900 includes background save notification 905. Background save notification 905 is an example of a dialogue that may be produced within the application to let a user know that a task to save a transaction, record, or journal entry, will continue in the background (i.e., on a separate thread pool). Background save notification 905 also informs a user that they will be notified when the save completes. In some examples, user interface environment 900 is displayed on the user interface of a computing device. Moreover, user interface environment may be running in a web browser displayed on a computing device.

Figure 10:
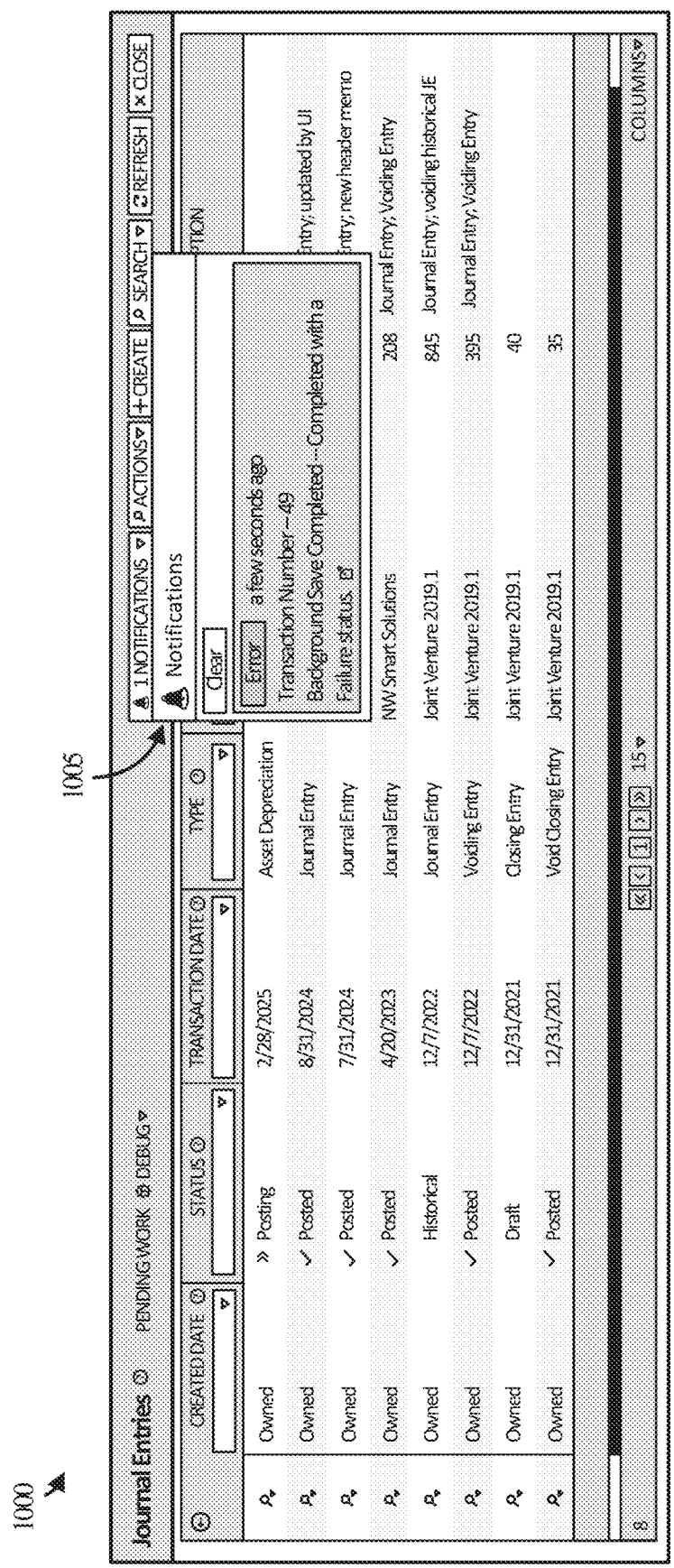
FIG. 10 illustrates an example of a user interface environment that notifies a user when an asynchronous background save has completed with one or more errors in accordance with some embodiments of the present technology.

FIG. 10 illustrates an example of a user interface environment in which certain embodiments of the present technology may be utilized. FIG. 10 illustrates user interface environment 1000, including the GUI of an application that includes background save functionality as described herein. User interface environment 1000 includes notification 1005. Notification 1005 serves to notify a user of the application that a transaction save (i.e., transaction number 49) that was completing in background save mode has completed with a failure status. In some examples, a user may select the notification to access more details on the completion and/or failure.

Figure 11:
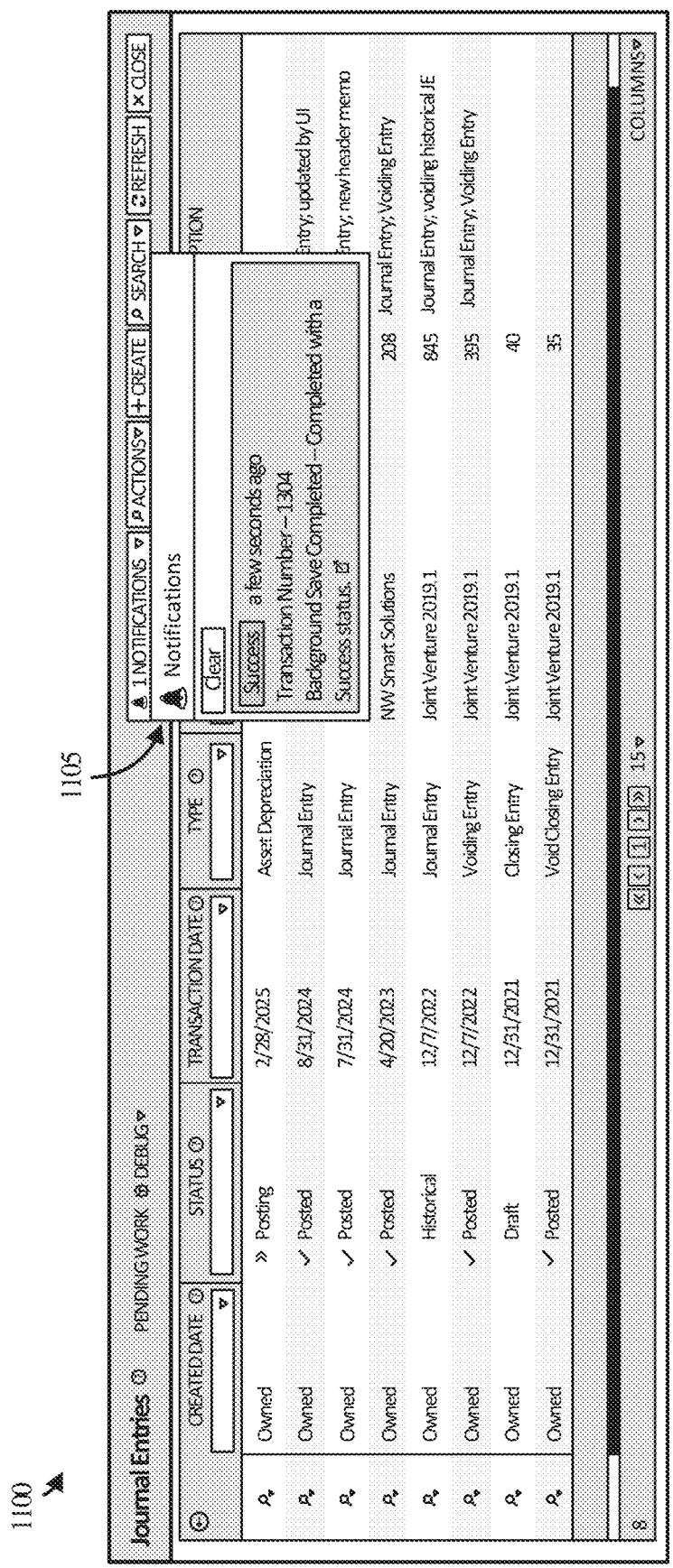
FIG. 11 illustrates an example of a user interface environment that notifies a user when an asynchronous background save has completed successfully in accordance with some embodiments of the present technology.

FIG. 11 illustrates an example of a user interface environment in which certain embodiments of the present technology may be utilized. FIG. 11 illustrates user interface environment 1100, including the GUI of an application that includes background save functionality as described herein. User interface environment 1100 includes notification 1105. Notification 1105 serves to notify a user of the application that a transaction save (i.e., transaction number 1304) that was completing in background save mode has completed with a success status. In some examples, a user may select the notification to access more details on the completion of the save and/or the transaction.

Figure 12:
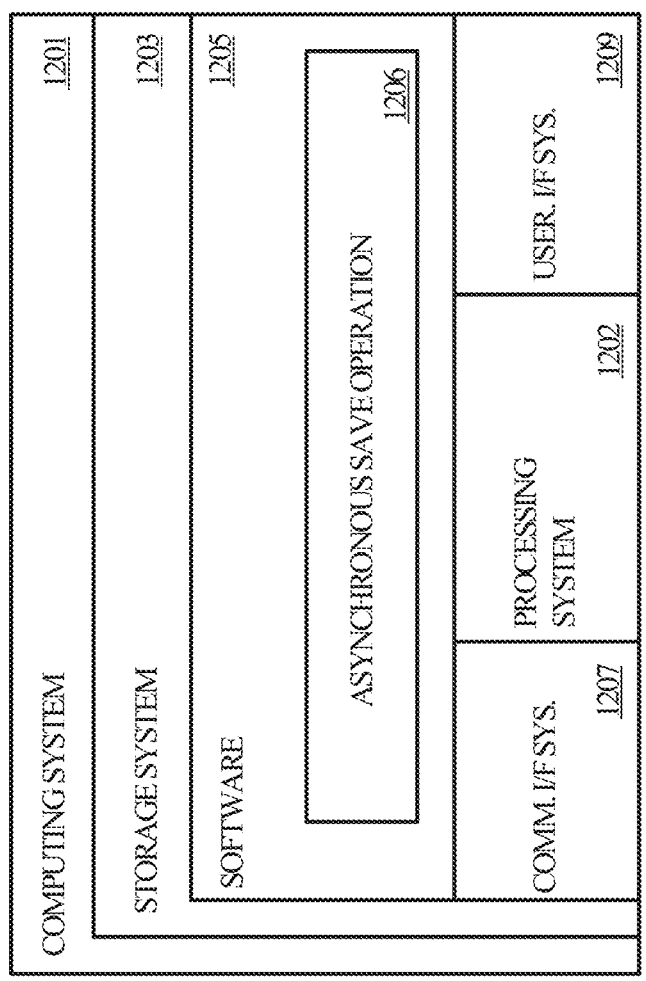
FIG. 12 is an example of a computing system in which some embodiments of the present technology may be utilized.

FIG. 12 illustrates computing system 1201 to perform asynchronous fallback save operations according to an implementation of the present technology. Computing system 1201 is representative of any computing system or collection of systems with which the various operational architectures, processes, scenarios, and sequences disclosed herein for saving large records to a database. Computing system 1201 may be implemented as a single apparatus, system, or device or may be implemented in a distributed manner as multiple apparatuses, systems, or devices.

Computing system comprises 1201 storage system 1203, communication interface 1207, user interface 1209, and processing system 1202. Processing system 1202 is linked to communication interface 1207 and user interface 1209. Storage system 1203 stores operates software 1205, which includes asynchronous fallback save operation 1206. Computing system 1201 may include other well-known components such as batteries and enclosures that are not shown in the present example for clarity. Examples of computing system 1201 include, but are not limited to, desktop computers, laptop computers, server computers, routers, web servers, cloud computing platforms, and data center equipment, as well as any other type of physical or virtual server machines, physical or virtual routers, containers, and any variation or combination thereof.

Processing system 1202 loads and executes software 1205 from storage system 1203. Software 1205 includes and implements asynchronous fall back save operation 1206, which is representative of the asynchronous fall back save operations discussed with respect to the preceding figures. When executed by processing system 1202 to perform the processes described herein, software 1205 directs processing system 1202 to operate as described for at least the various processes, operational scenarios, and sequences discussed in the foregoing implementations. Computing system 1201 may optionally include additional devices, features, or functionality not discussed for purposes of brevity.

Referring still to FIG. 12, processing system 1202 may comprise a micro-processor and other circuitry that retrieves and executes software 1205 from storage system 1203. Processing system 1202 may be implemented within a single processing device but may also be distributed across multiple processing devices or sub-systems that cooperate in executing program instructions. Examples of processing system 1202 include general purpose central processing units, graphical processing units, application specific processors, and logic devices, as well as any other type of processing devices, combinations, or variations thereof.

User interface 1209 comprises components that interact with a user to receive user inputs and to present media and/or information. User interface 1209 may include a speaker, microphone, buttons, lights, display screen, touch screen, touch pad, scroll wheel, communication port, or some other user input/output apparatus, including combinations thereof. User interface 1209 may be omitted in some examples.

Storage system 1203 may comprise any computer-readable storage media readable by processing system 1202 and capable of storing software 1205. Storage system 1203 may include volatile and nonvolatile, removable, and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer-readable storage media a propagated signal.

In addition to computer-readable storage media, in some implementations storage system 1203 may also include computer-readable communication media over which at least some of software 1205 may be communicated internally or externally. Storage system 1203 may be implemented as a single storage device but may also be implemented across multiple storage devices or sub-systems co-located or distributed relative to each other. Storage system 1203 may comprise additional elements, such as a controller, capable of communicating with processing system 1202 or possibly other systems.

Software 1205 (including asynchronous fallback save operation 1206) may be implemented in program instructions and among other functions may, when executed by processing system 1202, direct processing system 1202 to operate as described with respect to the various operational scenarios, sequences, and processes illustrated herein. For example, software 1205 may include program instructions for implementing asynchronous fallback save functionality in a cloud application as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1205 may include additional processes, programs, or components, such as operating system software, virtualization software, or other application software. Software 1205 may also comprise firmware or some other form of machine-readable processing instructions executable by processing system 1202.

In general, software 1205 may, when loaded into processing system 1202 and executed, transform a suitable apparatus, system, or device (of which computing system 1201 is representative) overall from a general-purpose computing system into a special-purpose computing system customized to provide background save functionality as described herein. Indeed, encoding software 1205 on storage system 1203 may transform the physical structure of storage system 1203. The specific transformation of the physical structure may depend on various factors in different implementations of this description. Examples of such factors may include, but are not limited to, the technology used to implement the storage media of storage system 1203 and whether the computer-storage media are characterized as primary or secondary storage, as well as other factors.

For example, if the computer readable storage media are implemented as semiconductor-based memory, software 1205 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface 1207 may include communication connections and devices that allow for communication with other computing systems (not shown) over communication networks (not shown). Examples of connections and devices that together allow for inter-system communication may include network interface cards, ports, antennas, power amplifiers, radio frequency (RF) circuitry, transceivers, and other communication circuitry. The connections and devices may communicate over communication media to exchange communications with other computing systems or networks of systems, such as metal, glass, air, or any other suitable communication media. Communication interface 1207 may be configured to use Time Division Multiplex (TDM), Internet Protocol (IP), Ethernet, optical networking, wireless protocols, communication signaling, or some other communication format, including combinations thereof. The aforementioned media, connections, and devices are well known and need not be discussed at length here.

Communication between computing system 1201 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

The techniques introduced herein may be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media or machine-readable medium suitable for storing electronic instructions.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "platform," "environment," or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further, any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method of operating at least one server, the method comprising:
   receiving, from an application accessed on a client device, a request to save a record to a database;
   in response to the request, commencing, in a first thread, a save operation comprising saving the record to the database;
   determining that the request is subject to a background save operation;
   upon determining that the request is subject to the background save operation, commencing the background save operation, wherein commencing the background save operation comprises transferring the save operation from the first thread to a background thread;
   releasing, while the background thread is performing the save operation, the first thread from performing the save operation; and
   completing the save operation in the background thread.

2. The method of claim 1, further comprising, upon commencing the background save operation in the background thread, enabling display of a background save notification on the client device, wherein the background save notification indicates that the record will continue saving in the background thread.

3. The method of claim 2, further comprising, upon completing the save operation, enabling display of a completion notification on the client device, wherein the completion notification indicates that the record saved successfully.

4. The method of claim 3, wherein receiving the request to save the record and determining that the request is subject to the background save operation is performed using the first thread.

5. The method of claim 4, wherein enabling display of the background save notification on the client device is performed using the first thread.

6. The method of claim 5, further comprising initiating a timer for the first thread upon determining that the request is subject to the background save operation.

7. The method of claim 6, wherein enabling display of the background save notification on the client device occurs upon completion of the timer.

8. The method of claim 7, wherein a connection between the client device and the first thread is closed upon completion of the timer.

9. One or more computer-readable storage media having program instructions stored thereon for performing asynchronous fallback save operations, wherein the program instructions, when read and executed by a processing system, direct the processing system to at least:
   receive, from an application accessed on a client device, a request to save a record to a database;
   in response to the request, commence, in a first thread, a save operation comprising saving the record to the database;
   determine that the request is subject to an asynchronous fallback save operation;
   upon determining that the request is subject to the asynchronous fallback save operation, commence the asynchronous fallback save operation, wherein to commence the asynchronous fallback save operation, the program instructions, when read and executed by the processing system, direct the processing system to transfer the save operation from the first thread to a separate thread;
   release, while the separate thread performs the save operation, the first thread from performance of the save operation; and
   complete the save operation in the separate thread.

10. The one or more computer-readable storage media of claim 9, wherein the program instructions, when read and executed by the processing system, further direct the processing system to, upon commencing the asynchronous fallback save operation in the separate thread, enable display of a fallback save notification on the client device, wherein the fallback save notification indicates that the record will continue saving in the separate thread.

11. The one or more computer-readable storage media of claim 10, wherein the program instructions, when read and executed by the processing system, further direct the processing system to, upon completing the save operation, enable display of a completion notification on the client device, wherein the completion notification indicates that the record saved successfully.

12. The one or more computer-readable storage media of claim 11, wherein receiving the request to save the record and determining that the request is subject to the asynchronous fallback save operation is performed using the first thread.

13. The one or more computer-readable storage media of claim 12, wherein enabling display of the fallback save notification on the client device is performed using the first thread.

14. The one or more computer-readable storage media of claim 13, wherein the program instructions, when read and executed by the processing system, further direct the processing system to initiate a timer for the first thread upon determining that the request is subject to the asynchronous fallback save operation.

15. The one or more computer-readable storage media of claim 14, wherein enabling display of the fallback save notification on the client device occurs upon completion of the timer.

16. The one or more computer-readable storage media of claim 15, wherein a connection between the client device and the first thread is closed upon completion of the timer.

17. A system comprising:
one or more computer-readable storage media;
a processing system operatively coupled with the one or more computer-readable storage media; and
program instructions stored on the one or more computer-readable storage media for providing a background save capabilities, wherein the program instructions, when read and executed by the processing system, direct the processing system to at least:
receive, from an application accessed on a client device, a request to save a record to a database;
in response to the request, commence, in a first thread, a save operation comprising saving the record to the database;
determine that the request is subject to a background save operation;
upon determining that the request is subject to the background save operation, commence the background save operation, wherein to commence the background save operation, the program instructions, when read and executed by the processing system, direct the processing system to transfer the save operation from the first thread to a background thread;
release, while the background thread is performing the save operation, the first thread from performing the save operation; and
complete the save operation in the background thread.

18. The system of claim 17, wherein the program instructions, when read and executed by the processing system, further direct the processing system to, upon commencing the background save operation in the background thread, enable display of a background save notification on the client device, wherein the background save notification indicates that the record will continue saving in the background thread.

19. The system of claim 18, wherein the program instructions, when read and executed by the processing system, further direct the processing system to, upon completing the save operation, enable display of a completion notification on the client device, wherein the completion notification indicates that the record saved successfully.

20. The system of claim 19, wherein receiving the request to save the record and determining that the request is subject to the background save operation is performed using the first thread.

* * * * *